United States Patent
Messinger

(10) Patent No.: US 10,960,266 B2
(45) Date of Patent: Mar. 30, 2021

(54) SYSTEM OF AN ARTIFICIAL INTELLIGENCE (AI) POWERED WIRELESS GYM

(71) Applicant: Samuel Messinger, Ramot Bet Shemish (IL)

(72) Inventor: Samuel Messinger, Ramot Bet Shemish (IL)

(*) Notice: Subject to any disclaimer, the term of this patent is extended or adjusted under 35 U.S.C. 154(b) by 0 days.

(21) Appl. No.: 16/403,645

(22) Filed: May 6, 2019

(65) Prior Publication Data
US 2020/0353314 A1    Nov. 12, 2020

(51) Int. Cl.
| A63B 24/00 | (2006.01) |
| G06N 20/00 | (2019.01) |
| G06Q 10/10 | (2012.01) |
| G06K 9/00 | (2006.01) |

(52) U.S. Cl.
CPC ...... *A63B 24/0075* (2013.01); *A63B 24/0087* (2013.01); *G06K 9/00342* (2013.01); *G06N 20/00* (2019.01); *G06Q 10/109* (2013.01); *A63B 2024/0081* (2013.01); *A63B 2225/15* (2013.01); *A63B 2225/20* (2013.01); *A63B 2225/50* (2013.01); *A63B 2225/68* (2013.01)

(58) Field of Classification Search
CPC ............ A63B 24/0075; A63B 24/0087; A63B 2024/0081; A63B 2225/20; A63B 2225/68; A63B 2225/15; A63B 2225/50; G06Q 10/109; G06N 20/00; G06N 2024/0081; G06N 2225/20
See application file for complete search history.

(56) References Cited

U.S. PATENT DOCUMENTS

| 7,056,265 B1* | 6/2006 | Shea ...................... G06Q 40/08 482/8 |
| 7,931,563 B2* | 4/2011 | Shaw .................... A61B 5/1118 482/9 |
| 8,360,785 B2* | 1/2013 | Park ....................... G06Q 10/10 434/247 |

(Continued)

*Primary Examiner* — Sundhara M Ganesan

(57) ABSTRACT

The subject matter of present disclosure teaches about a system of an artificial intelligence powered advance exercising facilities and method of working of the same. The system of an artificial intelligence powered advance exercising facilities of present embodiment eliminates need of permanent attached display over the exercise machines within the facilities by providing advance coupling of network enabled user devices of an exerciser, such as smartphone, laptop or any wearable smart devices to receive and display real time exercise data. Also, the system provides holding platforms for said user devices to safely hold the devices while user is exercising. Further, all the machines and equipment within the exercise facilities as well as surroundings such as wall of facilities of system are embedded with smart chips that monitors and transmits the real time exercise data of exerciser such as routine of exerciser, form and posture of exerciser, number of reps and count of dead weight etc. to the central artificial intelligence engine using local area network of exercise facility. The Artificial Intelligence engine, based on past exercise data, exercise regimen, health data and expert advices, prepares best workout routine and exercise schedule of the day for respective exerciser.

10 Claims, 21 Drawing Sheets

(56) References Cited

U.S. PATENT DOCUMENTS

| | | | | |
|---|---|---|---|---|
| 8,676,044 B2* | 3/2014 | O'Keeffe | | A61H 33/06 392/416 |
| 9,339,691 B2* | 5/2016 | Brammer | | A63B 71/0622 |
| 9,671,316 B2* | 6/2017 | Hsu | | G01M 99/005 |
| 9,792,542 B2* | 10/2017 | Curtis | | G02B 27/017 |
| 10,143,890 B2* | 12/2018 | Deutsch | | G06F 16/60 |
| 10,368,218 B1* | 7/2019 | Wisniewski | | |
| 2006/0058156 A1* | 3/2006 | Cohen | | A63B 24/00 482/4 |
| 2006/0205566 A1* | 9/2006 | Watterson | | A63B 24/0084 482/8 |
| 2007/0033069 A1* | 2/2007 | Rao | | A63B 24/00 705/2 |
| 2008/0045384 A1* | 2/2008 | Matsubara | | A63B 21/00181 482/4 |
| 2010/0035726 A1* | 2/2010 | Fisher | | A63B 24/0084 482/8 |
| 2012/0040799 A1* | 2/2012 | Jaquish | | A63B 21/00047 482/9 |
| 2014/0067097 A1* | 3/2014 | Harris | | A63B 71/06 700/91 |
| 2015/0066171 A1* | 3/2015 | Brussog | | H04L 67/125 700/91 |
| 2015/0190677 A1* | 7/2015 | Alsalem | | A63B 24/0075 700/91 |
| 2016/0007885 A1* | 1/2016 | Basta | | G16H 20/30 482/5 |
| 2017/0039480 A1* | 2/2017 | Bitran | | G06F 19/3481 |
| 2017/0100637 A1* | 4/2017 | Princen | | G06K 9/00342 |
| 2017/0113096 A1* | 4/2017 | Yu | | G06K 9/00342 |
| 2017/0266501 A1* | 9/2017 | Sanders | | A43B 3/0005 |
| 2017/0296900 A1* | 10/2017 | Hughes, Jr. | | A63B 71/00 |
| 2017/0345332 A1* | 11/2017 | Obay | | G09B 19/0038 |
| 2017/0368413 A1* | 12/2017 | Shavit | | G06K 9/00342 |
| 2018/0028896 A1* | 2/2018 | Ray | | A63B 71/0622 |
| 2018/0064992 A1* | 3/2018 | Rothman | | A63B 21/00181 |
| 2018/0199861 A1* | 7/2018 | Ye | | G16H 20/30 |
| 2018/0272190 A1* | 9/2018 | Miura | | A63B 24/0075 |
| 2018/0361203 A1* | 12/2018 | Wang | | G06N 20/00 |

* cited by examiner

SYSTEM OF AN ARTIFICIAL INTELLIGENCE (AI) POWERED WIRELESS GYM

FIELD OF THE INVENTION

The present disclosure relates to the system of an artificial intelligence controlled advance gym facilities. More specifically, the present disclosure relates to the system of AI powered smart exercising facility with smart monitoring and controlling chips, sensors and devices configured within the exercise machines, gym equipment, and at various locations within the surrounding and boundaries of the exercising facility, that by using artificial intelligence (AI) engine, receives specific personal information, exercise history, health history etc. of an exerciser in real time, compares it with previous data of the same exerciser, identifies training advice for exerciser and provides training advice to exerciser, wirelessly on any of the smart device of an exerciser.

BACKGROUND OF THE INVENTION

Conventional Exercise facilities with conventional exercise machines and equipment are less effective due to lack of expensive personal guidance, and monitoring by experts during exercise. Some exercisers require continuous monitoring due to health concerns such as cardio rehabilitation, recovery from accidents or other health issues. Also there is the unmet need of each of the exerciser to be guided and monitored personally by trainers and professionals for optimum results. Further, all the conventional exercise facilities use permanently attached monitoring display that shows real time exercise data of an exerciser but this information if almost always discarded after the user leaves the machine. Not any of the conventional exercise machine collects and stores the data of exerciser, analyzes the data and makes suggestions and a new workout schedule based on the workout.

The need for professional oversight is especially important for a beginner exerciser. Most all exercise routines require continuous monitoring and guidance from experts (trainers) during workout as well as for schedule and regimen of day to day workout. Also, expert help (trainers) are limited in the number of exercisers that can be supervised at any one time. In addition, not any expert can remember previous day's workout regimen, exercise program, machines and equipment used, number of reps etc. for real time guidance for all the exercisers within the facility. Therefore, it is desirable to have a system that guides the exerciser with his/her day to day exercise without need of personal monitoring of an expert and accompanying expense.

One such system is disclosed in U.S. Pat. No. 7,722,503B1 having title "System and method for automating an exercise routine" that discloses a system and method for assisting a user complete an exercise program. It discloses a system that allows a coach to design an exercise program for an individual client and have that program written to portable non-volatile media that is provided to the client. The client then moves from machine to machine during his or her workout program, in each case first inserting the memory card into the selected machine before starting to exercise. The selected machine, if it is one that has been specified in the client's exercise program, will automatically set its performance parameters to match those on the memory card after which the client will be able to immediately start exercising. Optionally, actual performance data from the user's workout will be written back to the memory card for subsequent printing and/or analysis.

Still, this kind of system and method are manual and requires expert to prepare and store workout strategy for individual exerciser into the USB storage device and the exerciser needs to install the USB storage device every time and in every machine he/she is using for exercise. Moreover, there is not any real time monitoring of data by any of the expert or any advance system. Further, this workout schedule and strategies are prepared by the experts once in a long period of time and not based on real time body condition and health of an exerciser.

Therefore, there exists a need of an advance Artificial Intelligence powered exercise facility or a gym having equipment that eliminates need of personal displays over all the conventional gym equipment and machines by providing capability to the machines and equipment to couple to the user device of exerciser such as smartphone, laptops or any wearable smart device through Artificial Intelligence Engine to display real time information of workout on user device.

There is further need of an Artificial Intelligence (AI) powered advance exercise facility with all the equipment as well as surroundings of an exercise facility such as walls and ceiling etc. embedded with smart chips, sensors and cameras to monitor exercise routine, form and posture of an exerciser in real time and wirelessly transmit it to the AI engine from where exerciser and person of concern such as trainer, doctor or physician may access the real time workout data over the wireless networking device.

Moreover, there is a need of an advance exercise facility equipped with smart chips and sensors embedded equipment that receives specific information, health and exercise history and exercise regimen of an exerciser, compares the data with previous workout data of same exerciser archived within the AI engine, Identifies or determines best training advice for and exerciser and provides training schedule and advice to the exerciser based on the real time health and previous data of an exerciser.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present disclosure teaches about a system of artificial intelligence (AI) powered advance exercising facilities and method of working of the same. The system of AI powered exercise facilities of the present invention overcomes all the above-mentioned needs of an advance exercise facility. The AI powered exercise facility eliminates needs of permanent attached displays over most of the exercise machines to display real time exercise data. This is achieved by providing a system that connects all the machines and equipment of exerciser facility with the central processing station which has an AI engine via the exercise facility network. As a result all the machines and equipment share real time data of each and every exerciser within the facility to the AI engine which can be accessed and monitored by the registered exercisers and all the designated persons using their personal network enabled user devices such as smart phone, laptop, tablet or any wearable smart devices by accessing the AI engine via exercise facility network over the user device.

Further, the system provides all the machines and equipment within the exercising facility with holding platforms for smart user devices in place of permanent fixed displays. The holding platforms hold the user devices safely during the exercise and allows user to monitor the real time data over said user device. The user device is any of the network enabled smart device, such as but not limited to, smartphone, laptop, tablet, smart watch or any wearable smart device.

Further, the system of an artificial intelligence powered exercising facility comprises all the machine and equipment as well as surrounding of the facilities, embedded with smart chips and cameras that monitors exercise routine, form and posture of an exerciser during exercise in real time and transmits that collected data to the central AI engine using exercising facility network that further stores the data for future reference and from where, exerciser and any other person of concern such as expert, trainer, doctor or physician may access the data to monitor and send comments and suggestions for exerciser over the network in real time and for future workouts.

The system of present invention, further compares the stored exercise data of an exerciser, health and exerciser history and exercise regimen with real time data of same exerciser and prepares best workout schedule and advice for said exerciser and send it to the exerciser over his/her smart user device via system network.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF INVENTION

Figure 1:
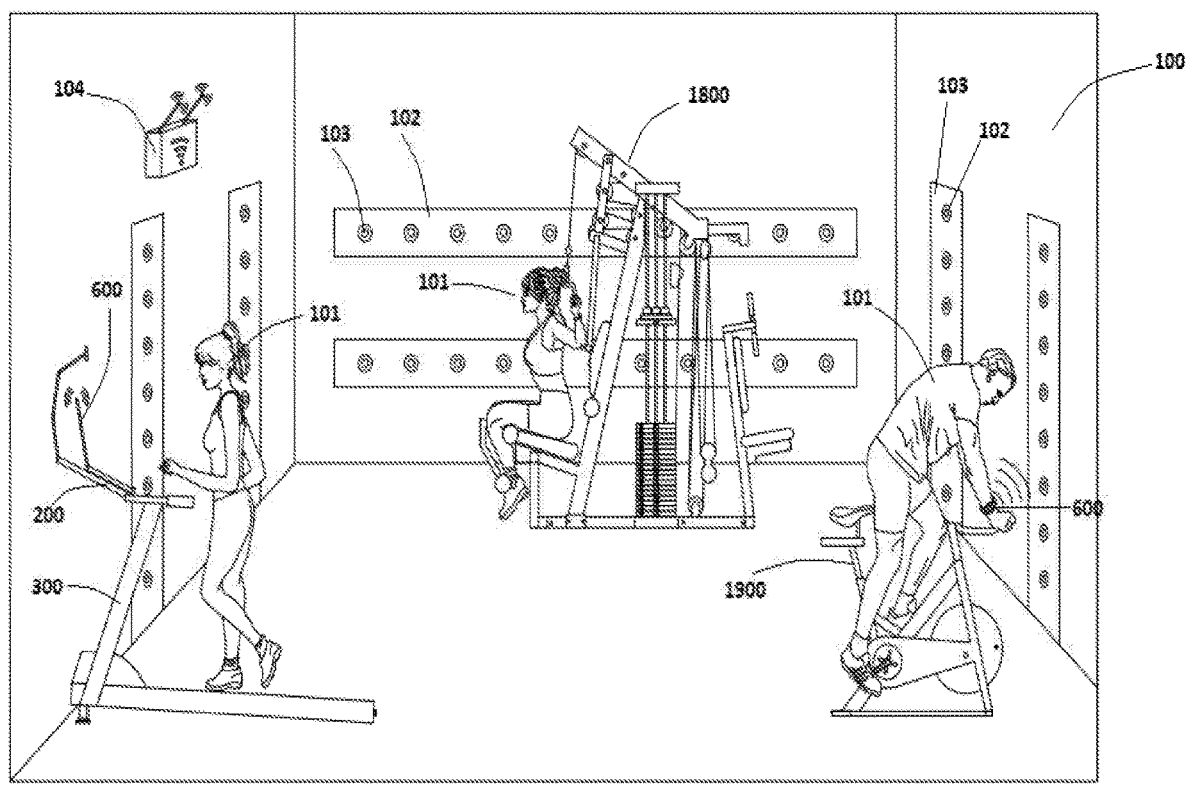
FIG. 1 illustrates one exemplary view of an artificial intelligence powered advance exercising facility of one embodiment of invention.

The embodiment herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the method and embodiments herein may be practiced and to further enable those of skill in the art to practice the embodiments herein. Accordingly, the examples should not be construed as limiting the scope of the embodiments herein.

According to an embodiment, the present invention provides an Artificial Intelligence powered advance exercising facility having exercising equipment as well as perimeter of an exercise facility embedded with smart chips, sensors and cameras to monitor real time activity, exercise routine, exercise regimen, form and posture of an exercisers etc., it further transmits and stores the real time monitored data wirelessly via Artificial Intelligence engine, and displays the data over the network enabled device of an exerciser, such as but not limited to, a smartphone, a laptop or any smart wearable device.

According to one aspect, the present system of an Artificial Intelligence (AI) powered advance exercising facilities based on the real time retrieved data of health of exerciser, regimen of exerciser, past exercise routine and history etc., identifies or evaluates best exercise routine and training advice for the exerciser using Artificial Intelligence (AI) and provides such information to the exerciser over the network enabled user device of an exerciser, wirelessly. According to one aspect, the system of an AI powered advance exercising facilities, based on real time and past archived data, evaluates best workout schedule, evaluates all machines for workout and sequence of machines for workout, evaluates number of reps, speed of reps and dead-weight for workout on each machine, evaluates new workout schedule based on real time body condition of exerciser during the workout and notifies the exerciser about new workout on a contemporaneous basis. The AI powered advance exercise facility and system further provides all the information of an exerciser from weight being lifted to number of reps, form and posture of an exerciser during exercise etc.

According to one aspect, the AI powered system for exercising facility eliminates the need of a permanent fixed display over all the machines of an exercise facility or Gym, instead of that, the system provides coupling of the network enabled user devices such as, but not limited to, smartphone, laptops, tablet or any smart wearable device with all the Gym equipment/machines using the exercise facility network that allows monitoring of workout data directly over the said user devices of an exerciser. Moreover, according to another embodiment, the system provides archiving each exercise routine in user devices on all the machines of the exercise facility to safely hold and display the information over the user device as opposed to the present experience where the exercise machine does not retain or evaluate the previous exercise routine.

Now referring to FIG. 1, which illustrates one exemplary view of an artificial intelligence powered system to make advance exercising facility 100 where all the walls and ceilings of the facility 100 is embedded with plurality of sensors and cameras 103 confined within the horizontal or vertical mounting members 102, that continuously monitors exerciser's posture or body position, speed of reps, dead-weight etc., and transmits the real time monitored data to the Artificial Intelligence engine to store and interpret the data, and based on that, prepare new strategy and schedule of exercise or machine of exercise or number of required reps and dead-weight etc. for the individual exerciser 101. The Artificial Intelligence engine is a central monitoring and control unit or a central remote server wirelessly coupled with the networks of all the advance exercising facilities that receives real time data of all the registered exerciser and machines within all the exercising facilities, stores the data, interprets the data, compares the real time data with past data of same exerciser and same machine, and accordingly, prepares and transmits required strategy of workout, workout regimen, machines to use, number of reps, required dead-weight etc. to the exerciser over his/her exercise facility's network coupled user device 600.

FIG. 1 further shows number of exercisers 101 having body wearable or other network enable user devices 600, working out on various smart chips embedded exercise machines. FIG. 1 is provided here for mere example and doesn't show all the machines and equipment of Gym, or exercise facility here, but it exemplarily illustrates some of the machines such as treadmill 300 with holding unit 200 of user devices 600, an exerciser 101 over a smart chips embedded exercise bike 1900 and wearing an smart wrist watch as a network enabled user device 600, and a smart chips embedded multipurpose gym machine 1800 with an exerciser 101 working out using multipurpose gym machine 1800. FIG. 1 further illustrates a networking device 104 that allows wireless coupling of smart chip embedded all the equipment and machine with the artificial intelligence engine, wirelessly, using exercise facility network, and also allows communicative coupling of network enabled user devices 600 with the exercise facility network, and hence, coupling with artificial intelligence engine and smart chip embedded machines and equipment.

Figure 2A:
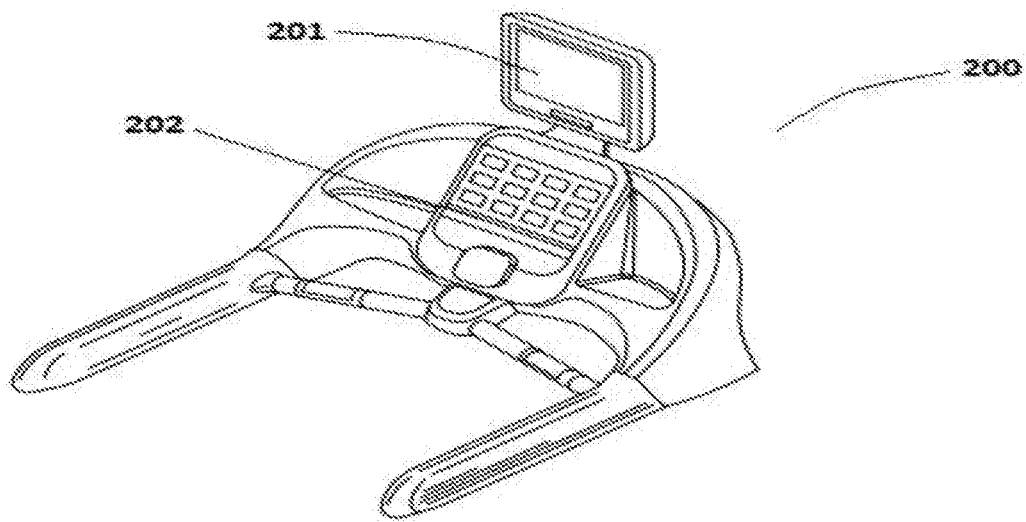
FIG. 2A illustrates a monitoring display in a conventional workout machine to display real time report of workout.
Figure 2B:
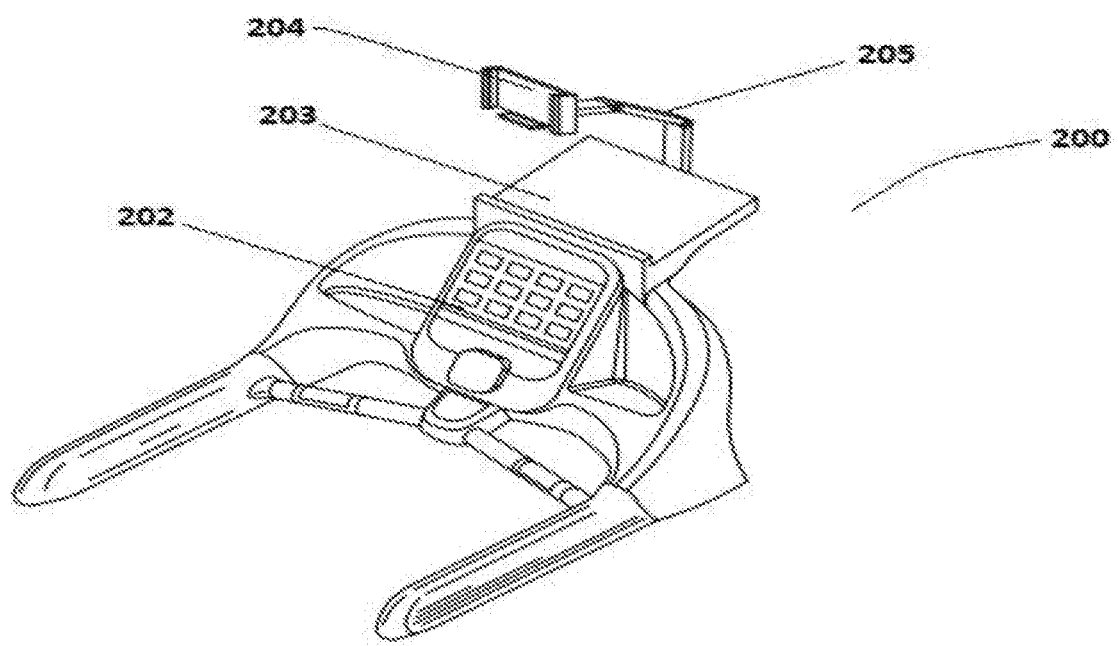
FIG. 2B illustrates improved stand facility to configure user devices like smart phone or a laptop to display and monitor real time workout data using artificial intelligence of present invention

Now FIG. 2A shows upper desk portion of any of conventional Gym machine 200 showing permanently attached display 201 for monitoring the activity with a keyboard unit 202 to manipulate machine operation. While, FIG. 2B illustrates improved design of an upper deck 200 of any of the gym machine according to one embodiment of invention, that eliminates need of a permanently attached display and instead of that, uses network enabled user devices to monitor and manipulate machine operations. The improved design is of an upper deck 200 is provided with a holding platform 203 to safely place laptop 600 of an exerciser to monitor the activity while working out. It is further provided with a smartphone holder 204 with height adjustable stand 205 that safely holds the smartphones 600 during workout, while the height adjustable stand 205 is configured to change the distance between the phone 600 and exerciser 101 according to user's choice or desire or to adjust the height of the holder 204 base to conform to the visibility of an exerciser.

Figure 2C:
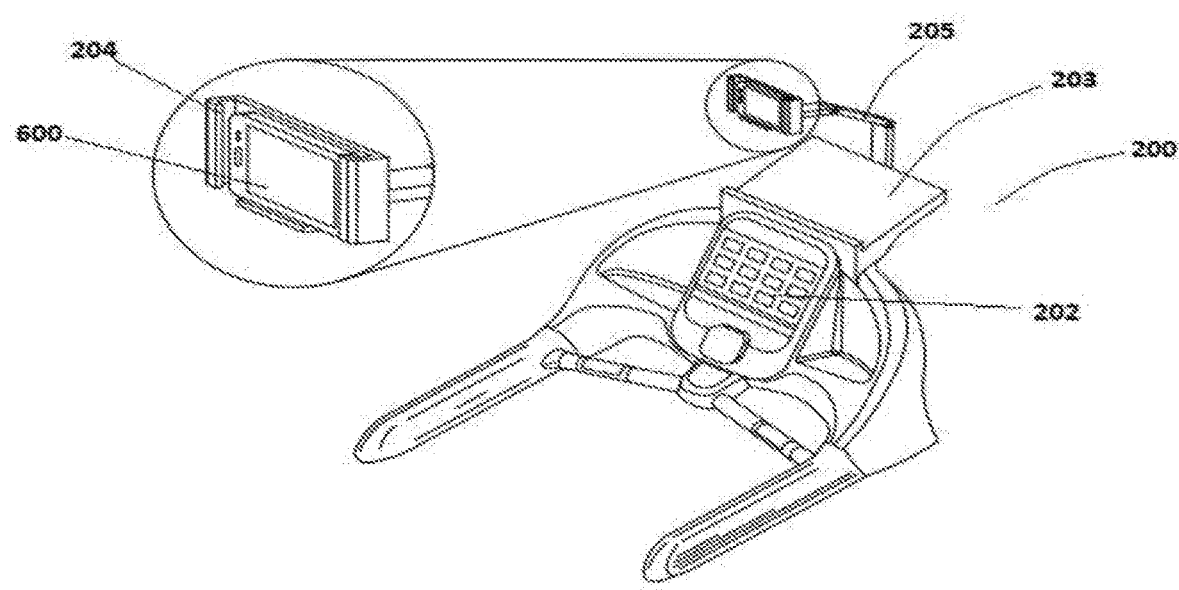
FIG. 2C shows zoomed in view of an improved stand facility of FIG. 2B with smart phone configured within the stand, according to an embodiment of an invention.
Figure 2D:
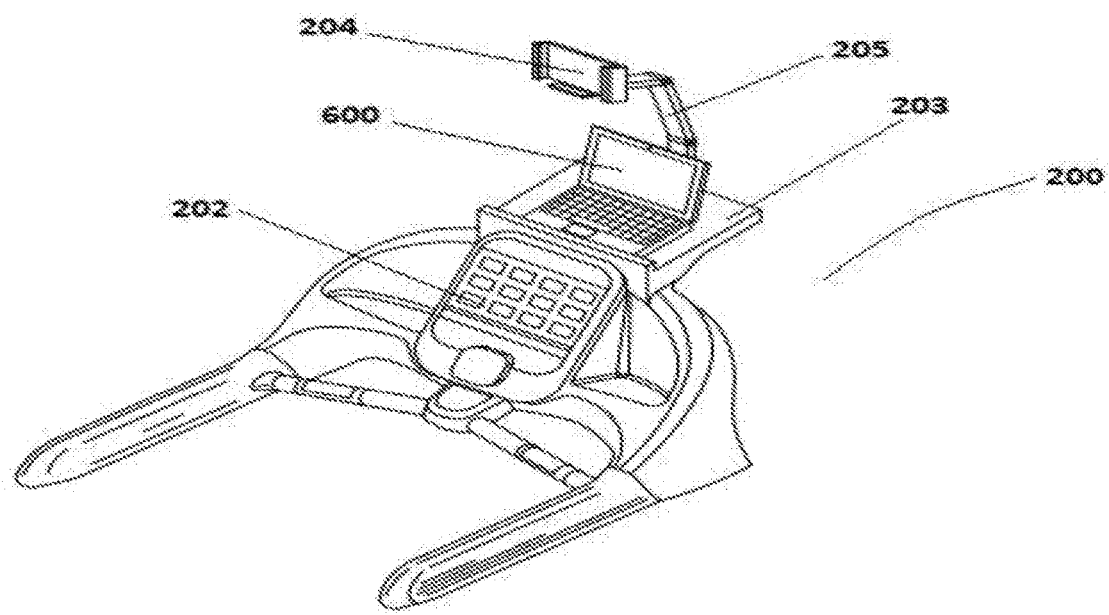
FIG. 2D shows view of an improved stand facility of FIG. 2B having laptop configured over stand, according to an embodiment of present invention.

Now. FIG. 2C shows improved design of upper deck 200 of FIG. 2B with zoomed in view of a smartphone 600 fixed within the holder 204 of an upper deck 200. While FIG. 2D shows a laptop 600 placed over a holding platform 203 of an upper deck 200 of FIG. 2B. According to one aspect of, FIGS. 2A, 2B and 2C illustrates an improved design of an upper deck 200 which comprises a keyboard 202 that allows manipulation of machine operation directly along with capability of manipulation using network enabled user devices 600.

Figure 3:
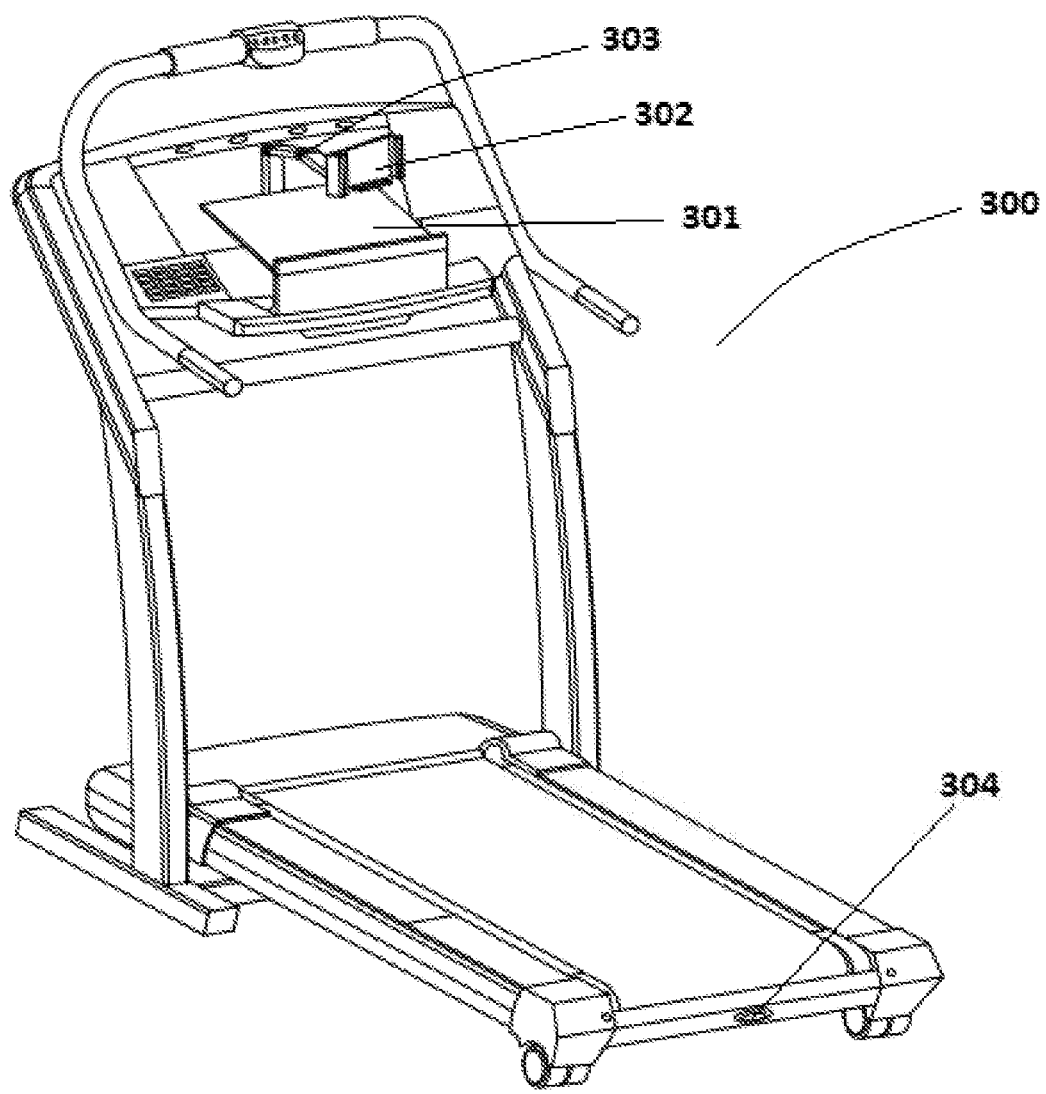
FIG. 3 shows treadmill with improved stand facility for placement of network enabled user devices, according to an embodiment of an invention.

Referring to FIG. 3 that discloses an advance treadmill 300 with an embedded smart chip 304 to record and transmit the real time exercise data such as speed, position of exerciser, time duration of exercise etc. to the remote Artificial Intelligence engine using exercise facility network. The advance treadmill 300 of present embodiment, further includes a holding stand 301 for laptop 600 and a holder 302 configured using adjustable stand 303 for safely holding smartphone 600 during exercise, where the user devices 600 such as smart phone or laptops, by wirelessly coupling with the exercise facility network, displays real time monitored and collected data of smart chips 304.

Figure 4A:
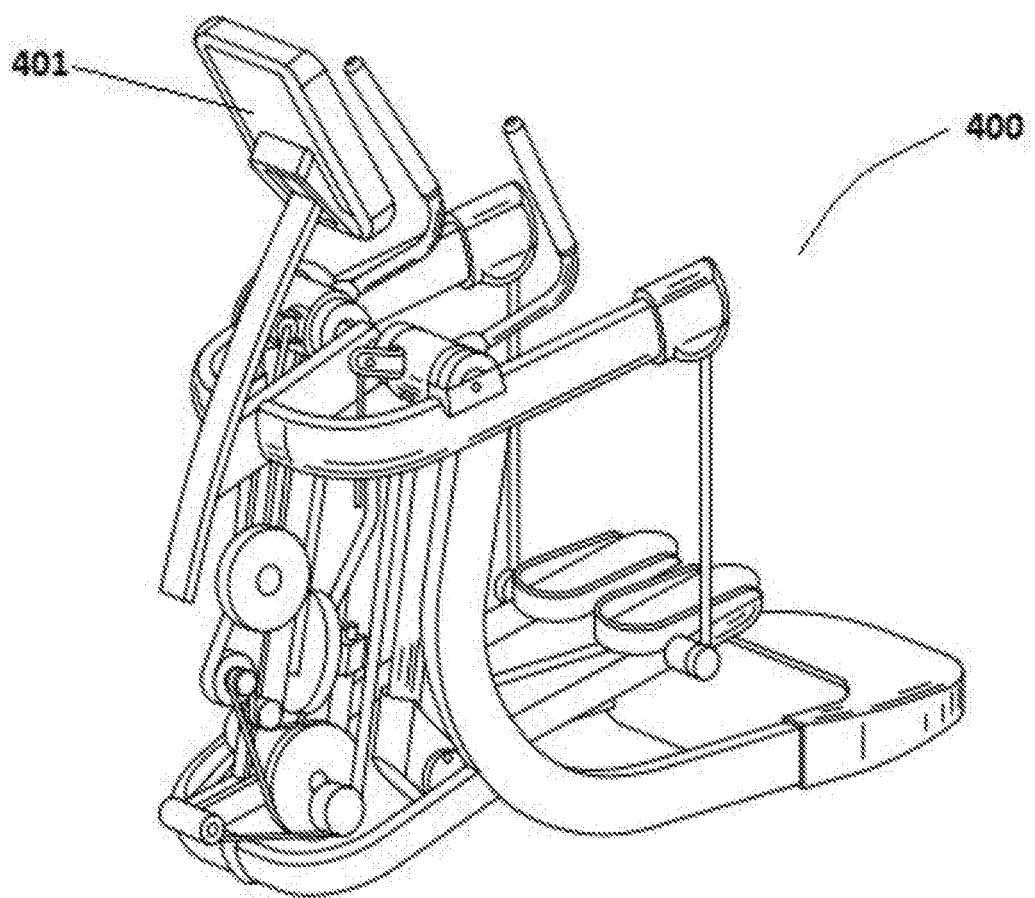
FIG. 4A shows a cross country skiing trainer exerciser with conventional display to monitor and display parameters of workout.
Figure 4B:
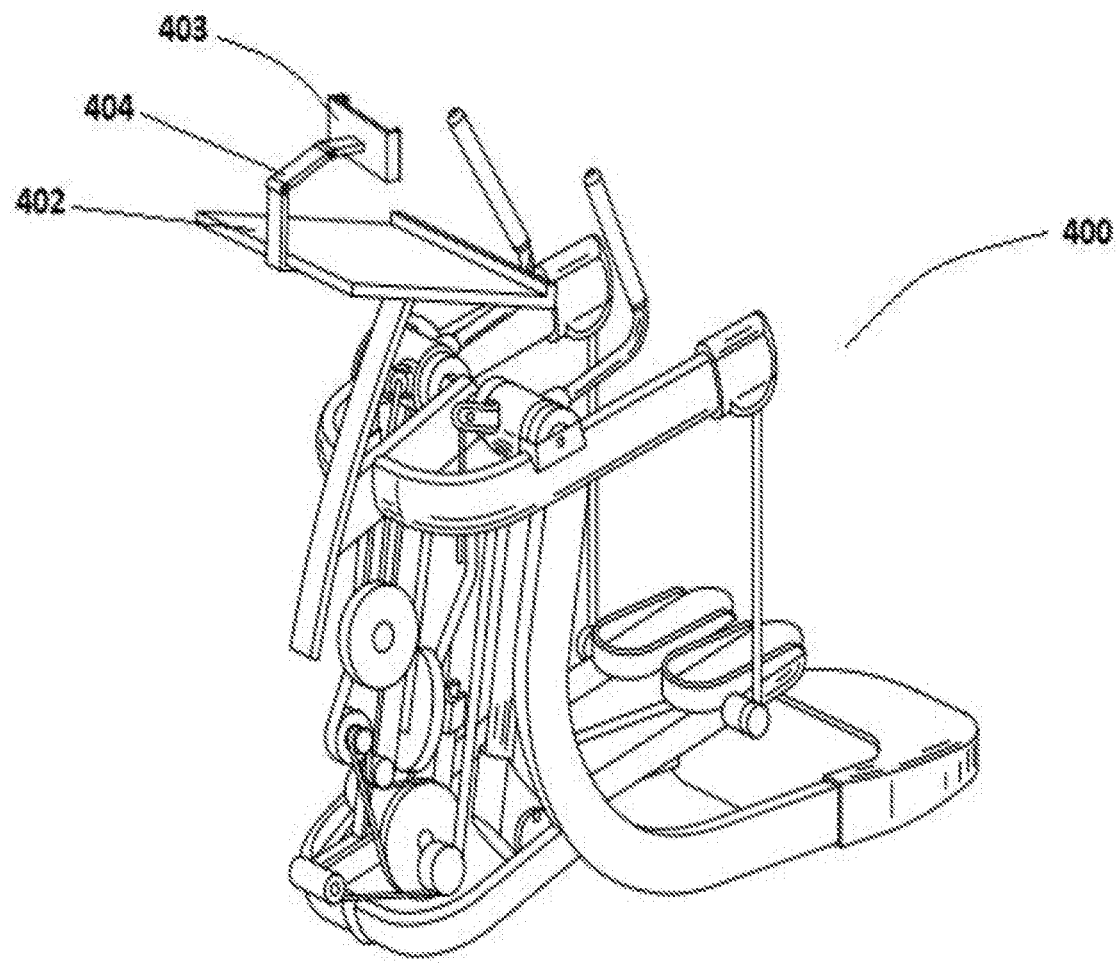
FIG. 4B illustrates a cross country skiing trainer exerciser with improved stand facility for placement of network enabled user device instead of permanently fixed display as shown in FIG. 4A.

FIG. 4A shows one exemplary view of a conventional arc trainer 400 with conventional permanent attached display 401 to monitor and display real time work out data. While, FIG. 4B exemplarily illustrates same conventional elliptical trainer 400 with advance smart chips (not shown) and a holding unit 402 for safely holding laptop 600, and a holder 403 with adjustable stand 404 for adjustably holding smartphone 600 during workout to display real time workout data.

Figure 5:
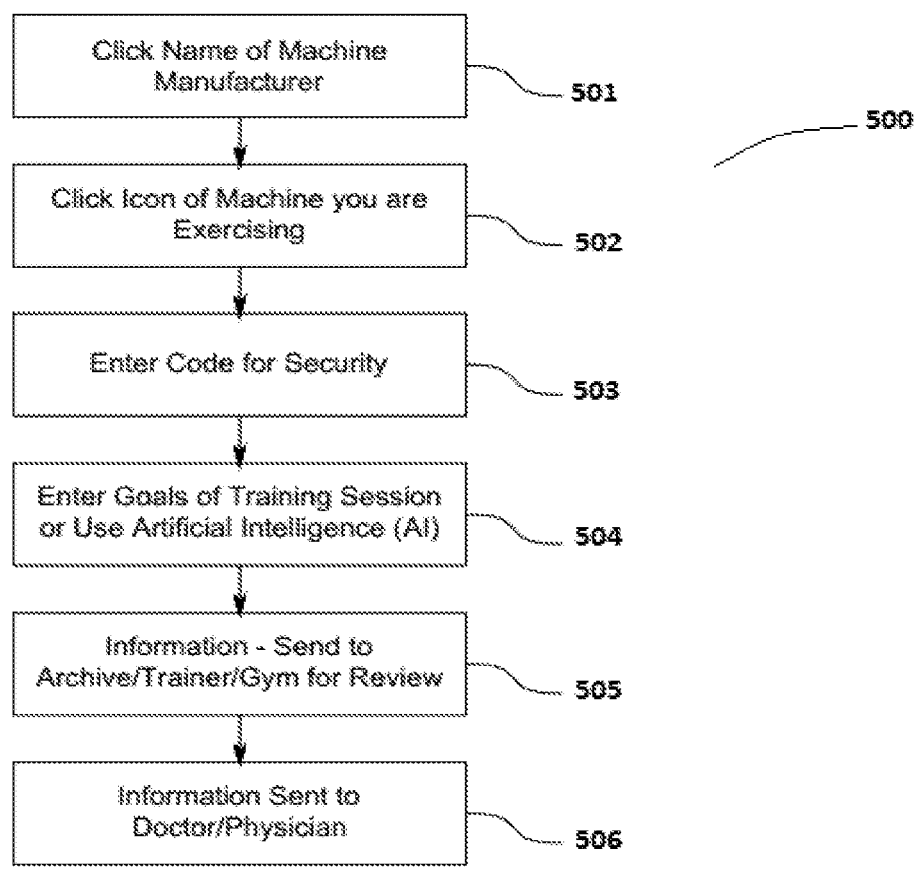
FIG. 5 illustrates flow diagram for coupling the network enabled user device with gym equipment via artificial intelligence.

Now, FIG. 5 is a flow diagram of method or process 500 of coupling of network enabled user devices 600 with gym equipment and artificial intelligence engine using the exercise facility network. The process or method 500 for coupling the user device 600 with the AI engine and with all the machines and equipment within the exercise facility is done by first starting AI powered advance gym system's virtual platform over network enabled user device 600; coupling the user device 600 to the artificial intelligence engine and then local exercise facility network using the virtual platform of a system which then starts to display name of machine and name of manufacturer of the same, within the facility, now further steps includes selection of the manufacturer of machine 501 on which the exerciser desires to workout which then displays icons of all the machines and equipment of that manufacturer within the facility; selection of machine by clicking on the icon of desired machine for exercising 502; entering security code of a machine 503; Entering goals of training session or whether in desire of an Artificial Intelligence to guide with exercise routine for that session 504; Sending all the information to Archive storage or to the trainer or a Gym for review over a network 505; and further sending the information to registered doctor or physician 506 of an exerciser.

Figure 6:
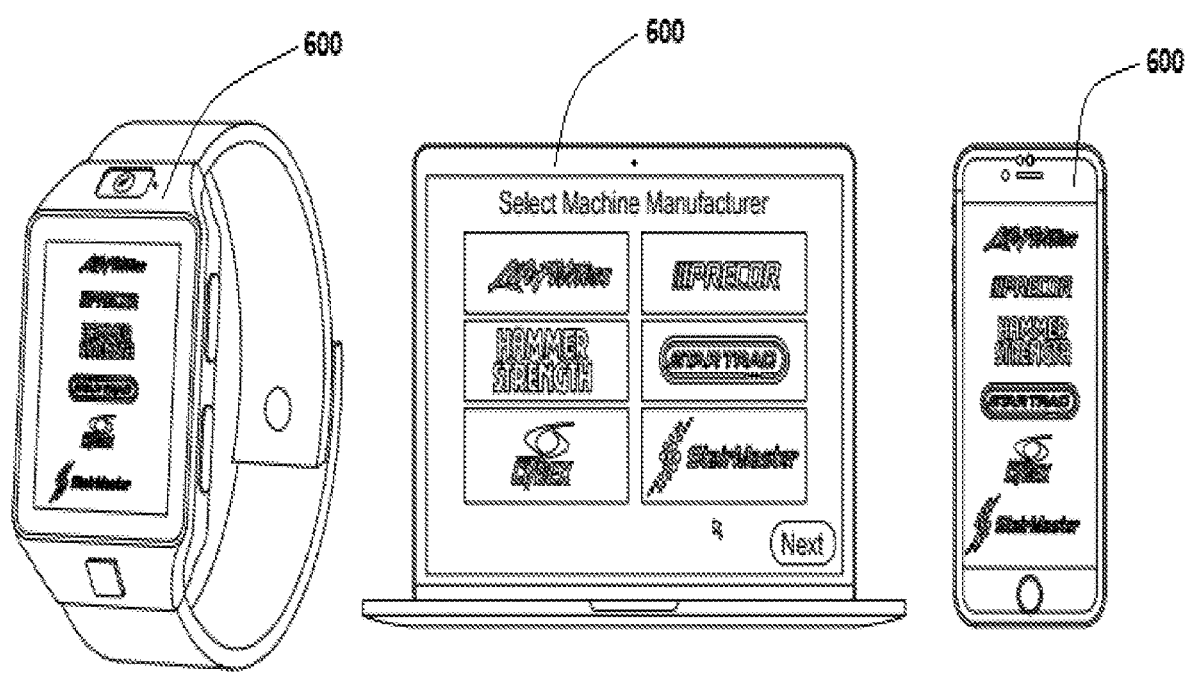
FIG. 6 exemplarily illustrates some network enabled user devices displaying networking platform of an Artificial Intelligence powered exercise facility.

FIG. 6 exemplarily illustrates some network enabled user devices 600 displaying virtual platform of an artificial intelligence powered exercising facility system where the display shows name of the machine manufactures from where user selects name or icon of manufacturer, which then displays all the exercising machines of the same manufacturer within the workout facility, then user may touch and selects any of the machine he/she desires to work out in the cases when the exerciser does not seeks guidance and exercise schedule from Artificial Intelligence Engine of the system and have his/her own desired workout schedule in mind. According to one another aspect, when the exerciser login and selects an Artificial Intelligence Guidance option within the virtual platform of an artificial intelligence powered exercising facility system, the system of an artificial intelligence powered exercising facility, by monitoring and analyzing exerciser's real time body condition, past workout data and real time or archived expert's advice on exercise, prepares and provides a best workout schedule for the day for the exerciser. Further, the Artificial Intelligence powered system monitors workout of an exerciser in real time, based on its workout schedule suggestion of that day and guides the exerciser to machine by machine exercise in real time. According to one more aspect, the network enabled user device can be selected from any of the, laptop, smartphone, wristwatch or any of the wearable smart device. Hence, all of the devices are numbered as 600, without departing from the scope of the invention, it is to understood that, network enabled user device described herein can be any of the abovementioned user devices.

Figure 7A:
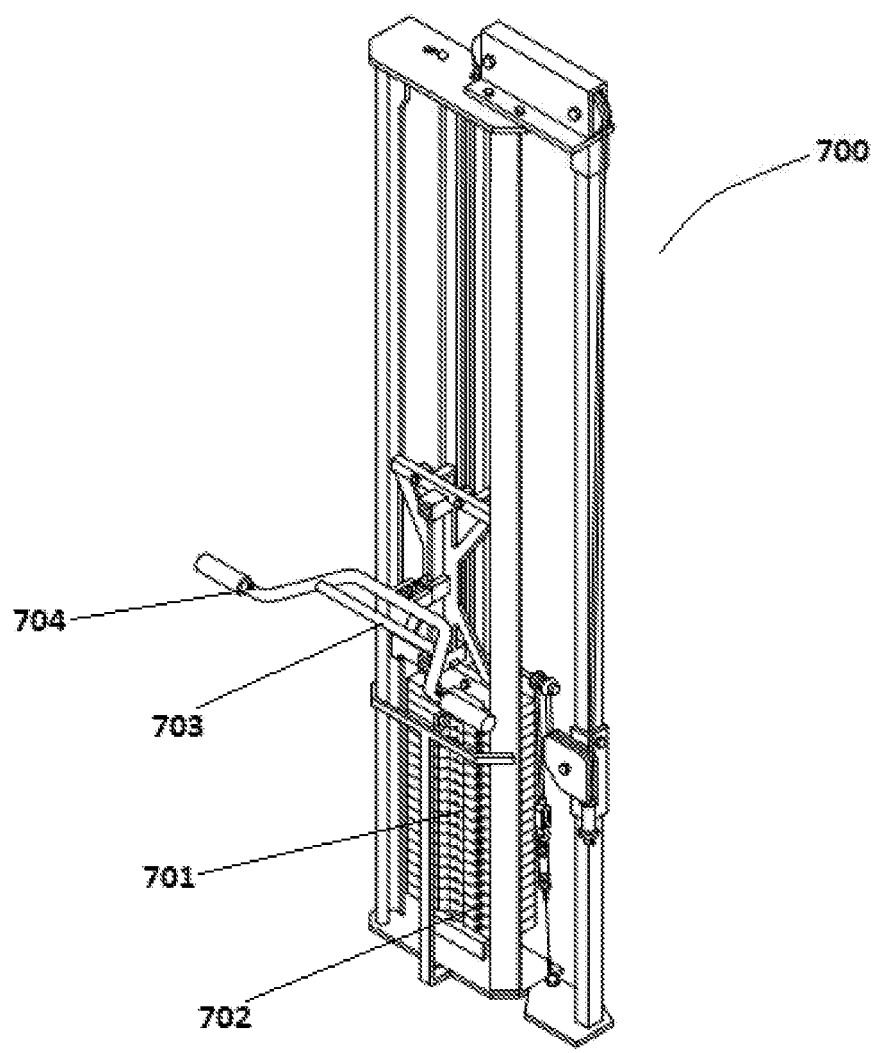
FIG. 7A and FIG. 7B shows Lateral Pulldown Machine gym equipment with embedded smart chips within various components of it, according to an embodiment of present invention.
Figure 7B:
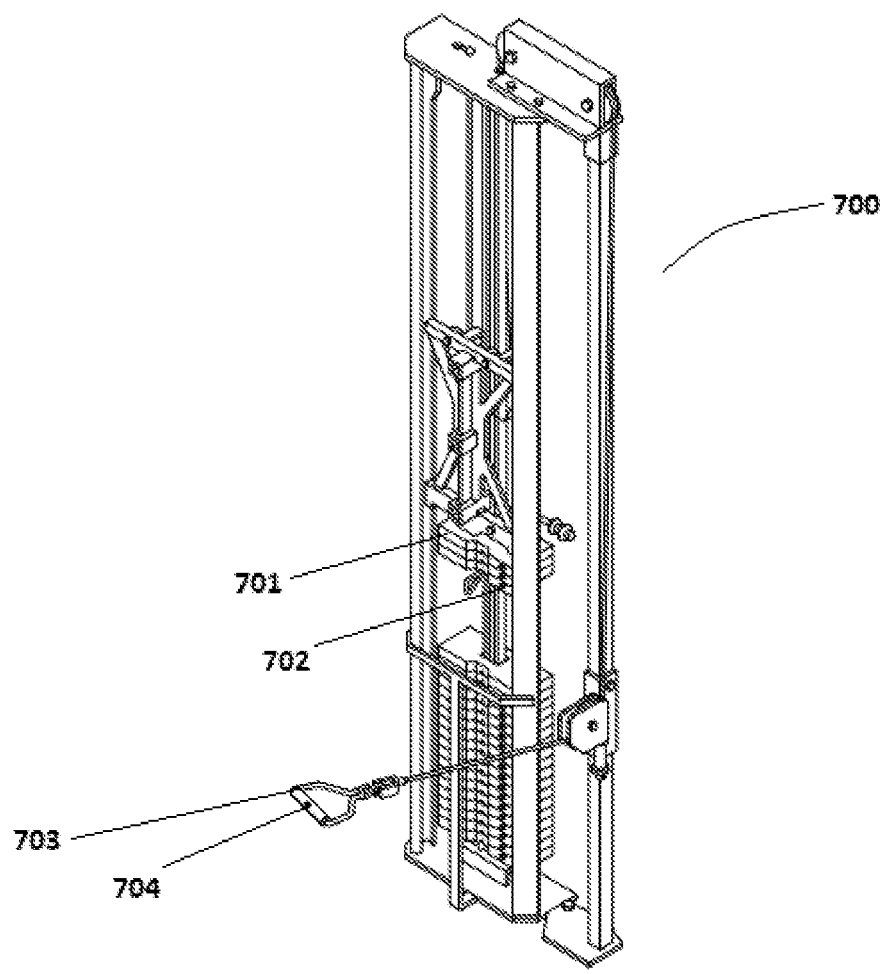

FIG. 7A to FIG. 11 exemplarily illustrates various machines and equipment of an exercise facility or Gym, embedded with smart chips which is the combination of sensors and processors that monitors, records and transmits real time exercise data to the artificial intelligence engine via exercise facility network. FIG. 7A shows a Lateral Pulldown Machine 700 having a plurality of dead-weight plates 701, each of which are embedded with smart chips 702. The Lateral Pulldown Machine 700 of present embodiment further comprises a permanently attached barbell 703 which is also embedded with a smart chip 704 that monitors activity, position, reps, weight etc. during the exercise and transmits it to the AI engine. Further, FIG. 7B shows one another embodiment of the cable tower machine 700 with smart chip 702 embedded within plurality of dead weights 701 and a grip 703 embedded with the smart chip 704. All the smart chips referred hereinafter are combination of various sensors and processor that monitors all the real time data of the exerciser during exercise and transmits it to the AI engine via exercising facility network.

Figure 8:
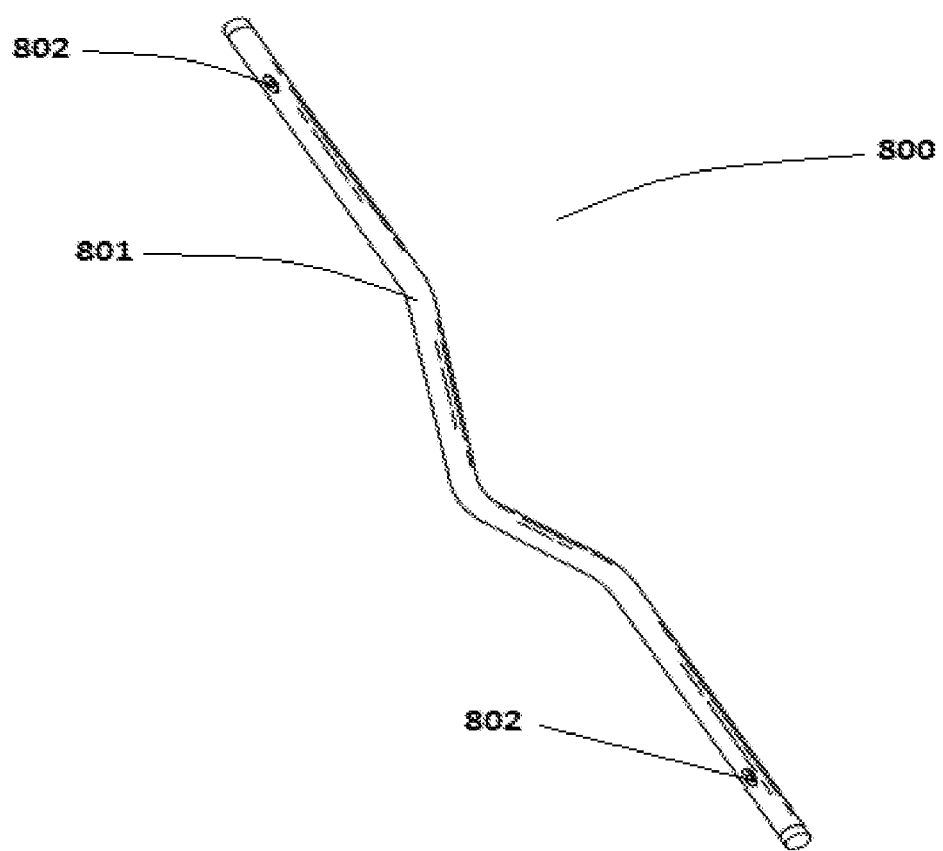
FIG. 8 shows a barbell embedded with smart chips, according to an embodiment of present invention.
Figure 9A:
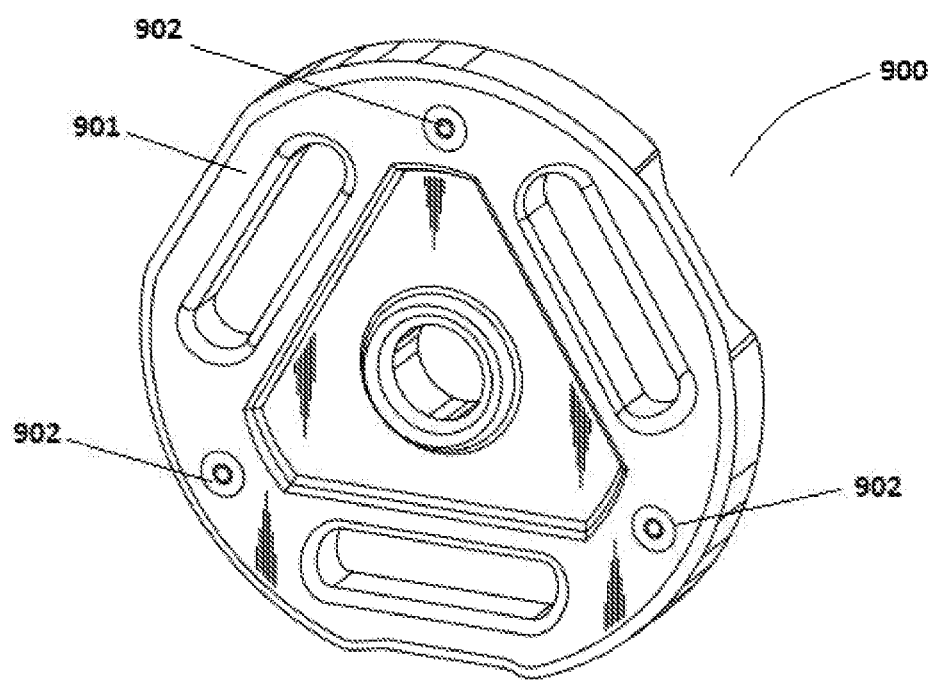
FIGS. 9A and 9B illustrates a gym weight plates embedded with smart chips, according to an embodiment of present invention.
Figure 9B:
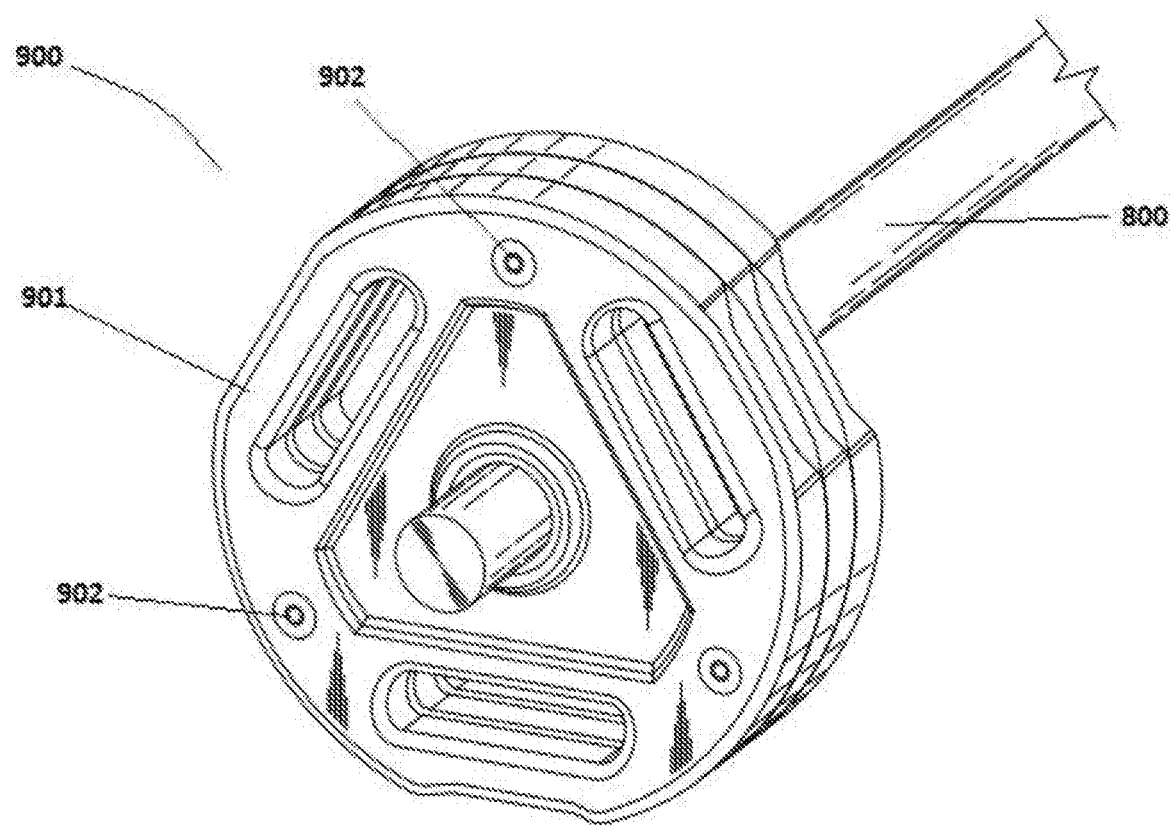

FIG. 8 shows an advance embodiment of a barbell 800, embedded with plurality of smart chips 802 within the metallic body 801 of a barbell to monitor grip, reps, position etc. during exercise. FIG. 9A and FIG. 9B illustrates Gym weight plates 900 with embedded smart chips 902 within the body 901 of the weight plates 900 that further monitors number of weight plates 900 and weight attached on the barbell 800 during the exercise.

Figure 10:
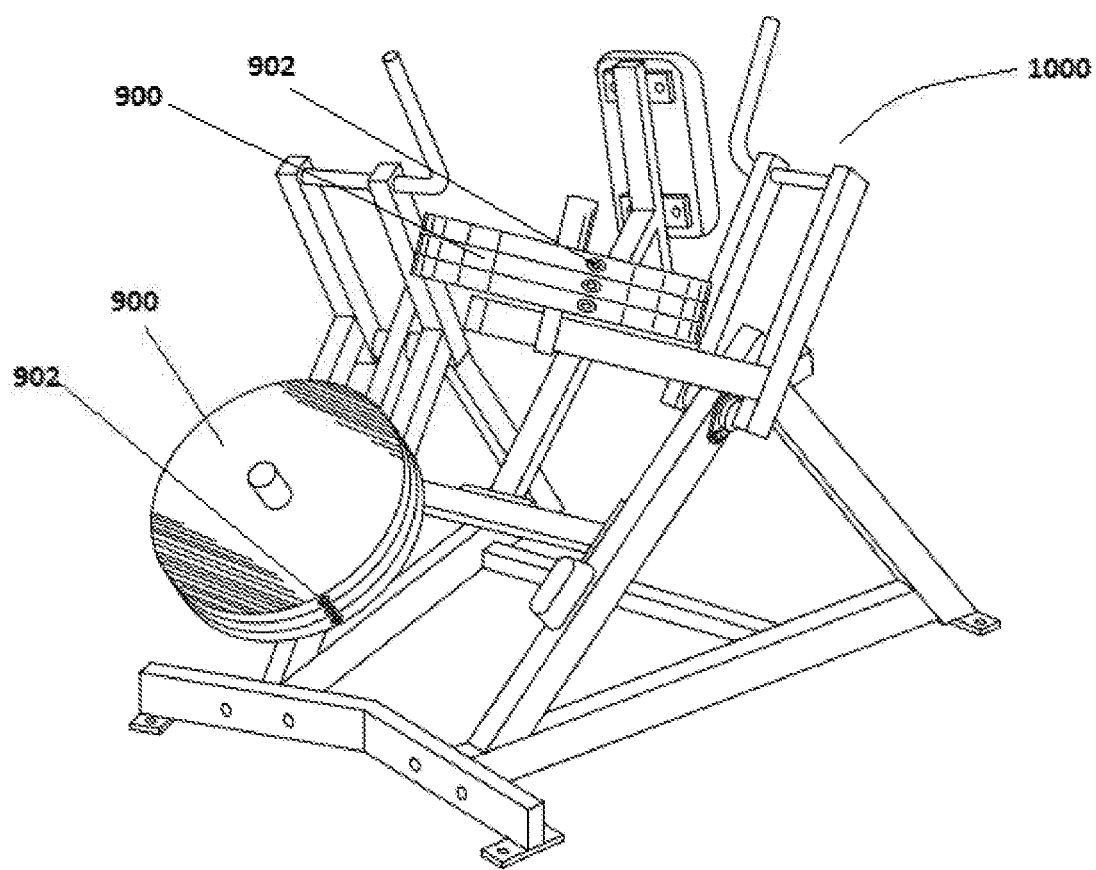
FIGS. 10 and 11 shows various exercise machines embedded with smart chips, according to an embodiment of present invention.
Figure 11:
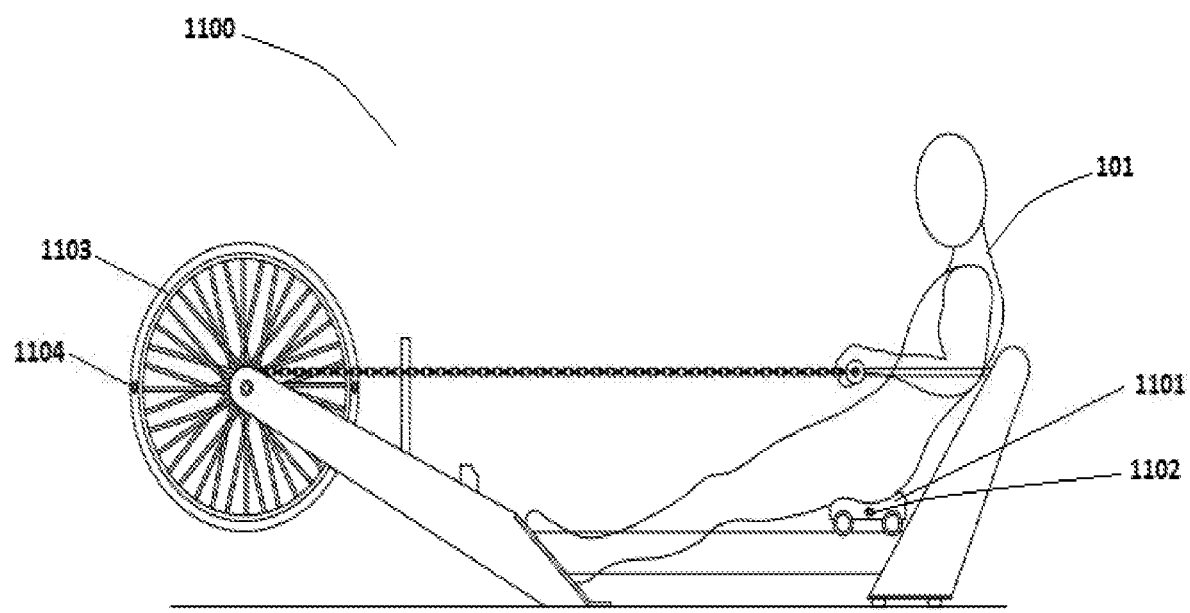

Same as aforementioned some machines, FIG. 10 also discloses exemplary embodiments of machine 1000 having plurality of smart chip 902 embedded weight plates 900. While FIG. 11 discloses an exemplary embodiment of one another exercise machine 1100 having smart chip 1102 embedded sitting seat 1101 and a smart chip 1104 embedded wheel 1103 which is a part of a machine 1100, that monitors sitting position as well as number of reps and weight, duration, speed of reps etc., and transmits the real time data to the artificial intelligence engine.

Figure 12:
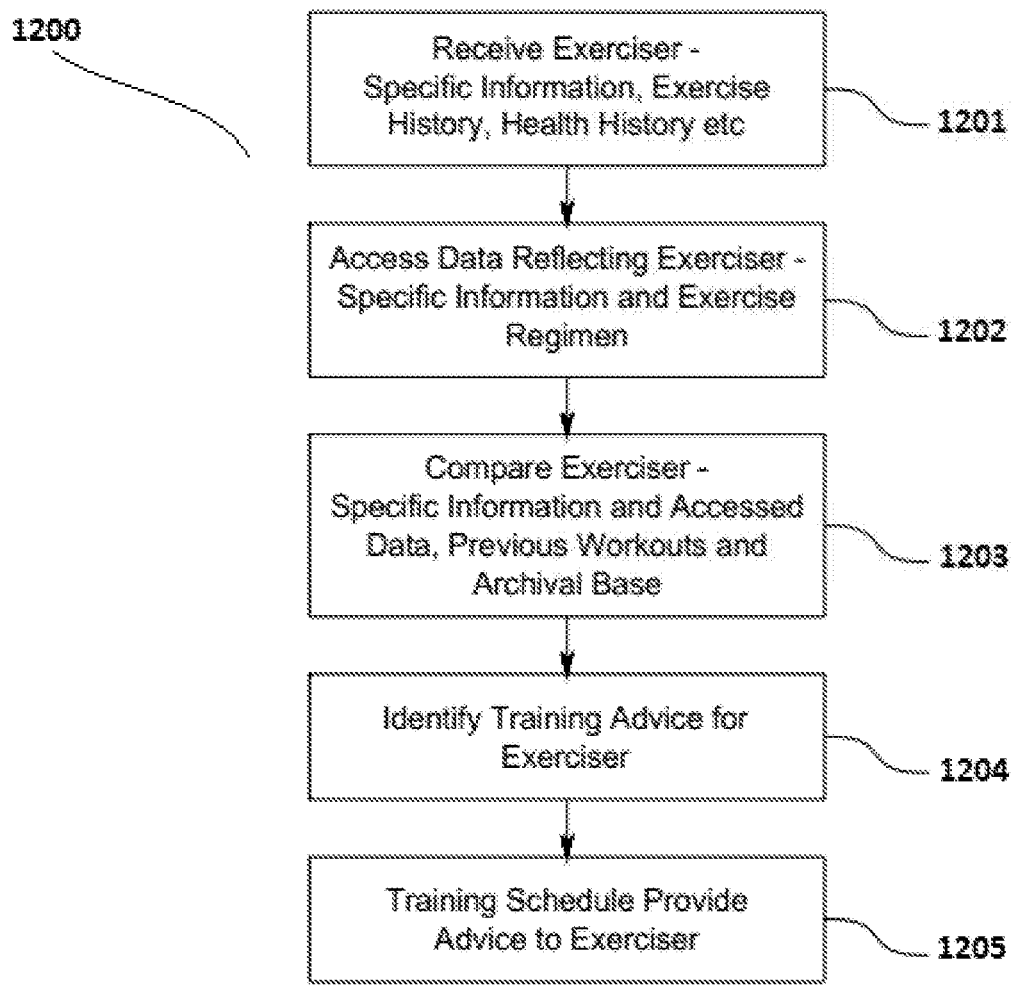
FIG. 12 is a flowchart illustrating a provision training schedule and workout advice, according to one embodiment of an invention.

Now referring to FIG. 12 that exemplarily illustrates flowchart 1200 of a provision of training schedule and workout advice prepared and provided by the Artificial Intelligence Unit of the system based on past and present workout data, exercise regimen or diet and body health of the exerciser. The flowchart 1200 for preparation and providing training advice and schedule by Artificial Intelligence unit to the exerciser comprises steps of: Receiving exercisers specific information to determine the registered exerciser within the system, exercise and health history of said exerciser 1201; Accessing data reflecting exerciser's specific information and exercise regimen 1202; Comparing exerciser's specific information and accessed data with previous workout and archived data 1203; Identifying and evaluating training advice for exerciser 1204; and providing training advice and schedule to the exerciser on his/her user device 1205.

Figure 13:
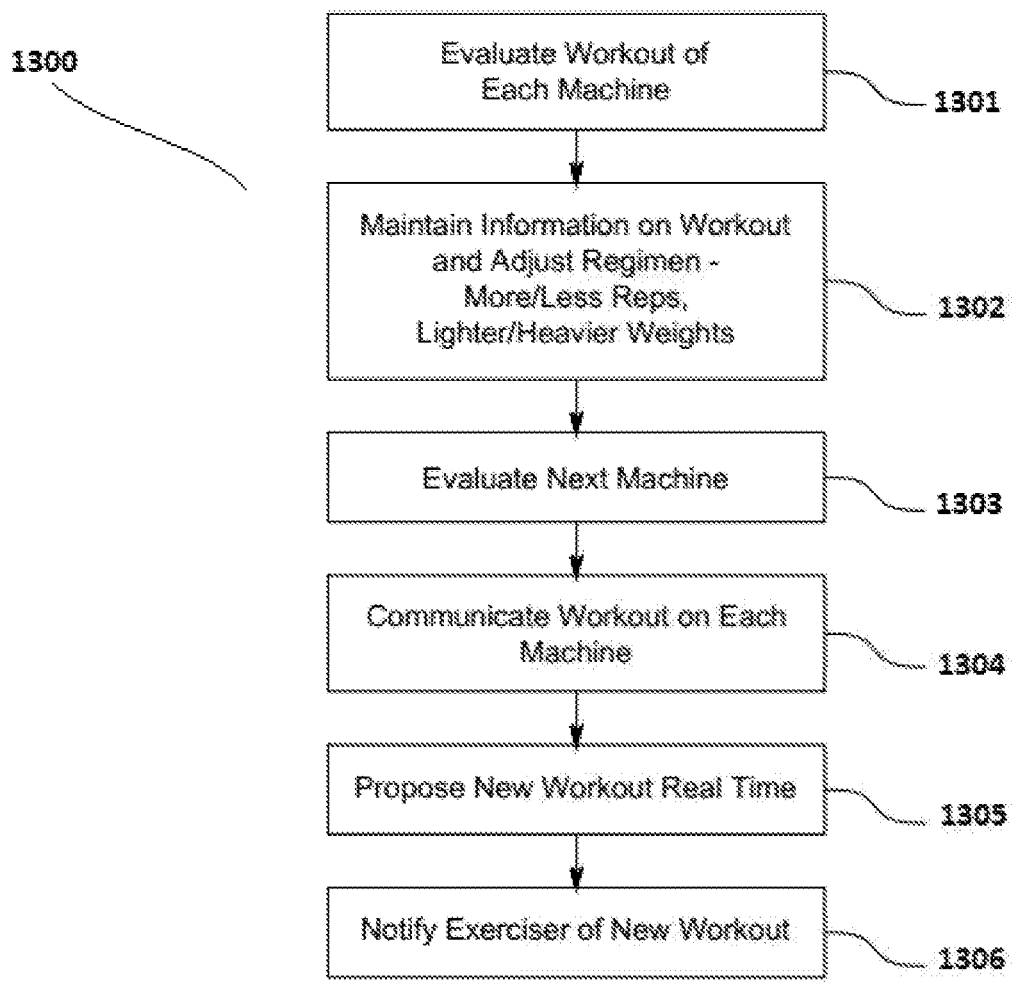
FIG. 13 is a flowchart illustrating provision or recommendation of gym equipment, exercise regimen etc. based on training schedule and workout advice, according to an embodiment of an invention.

The Artificial Intelligence powered system for advance exercising facilities of present invention, provides detailed training schedule and workout suggestion from type of workout to machines to use for that workout, and also provides suggestions of number of required reps and deadweight etc. FIG. 13 illustrates a flowchart showing a provision for recommendation of gym equipment, exercise regimen etc. 1300 based on training schedule and workout advice, according to one embodiment. The provision of process of providing recommendation of gym equipment, exercise regimen etc. 1300 includes steps of: Evaluating workout of each machine 1301; maintaining information on workout and adjust regimen—More/Less reps, Light/Heavier Weights 1302; evaluating next machine 1303; communicating workout on each machine with AI engine and with exerciser 1304; proposing new workout in real time 1305; Notifying new workout to an exerciser in real time 1306.

Figure 14:
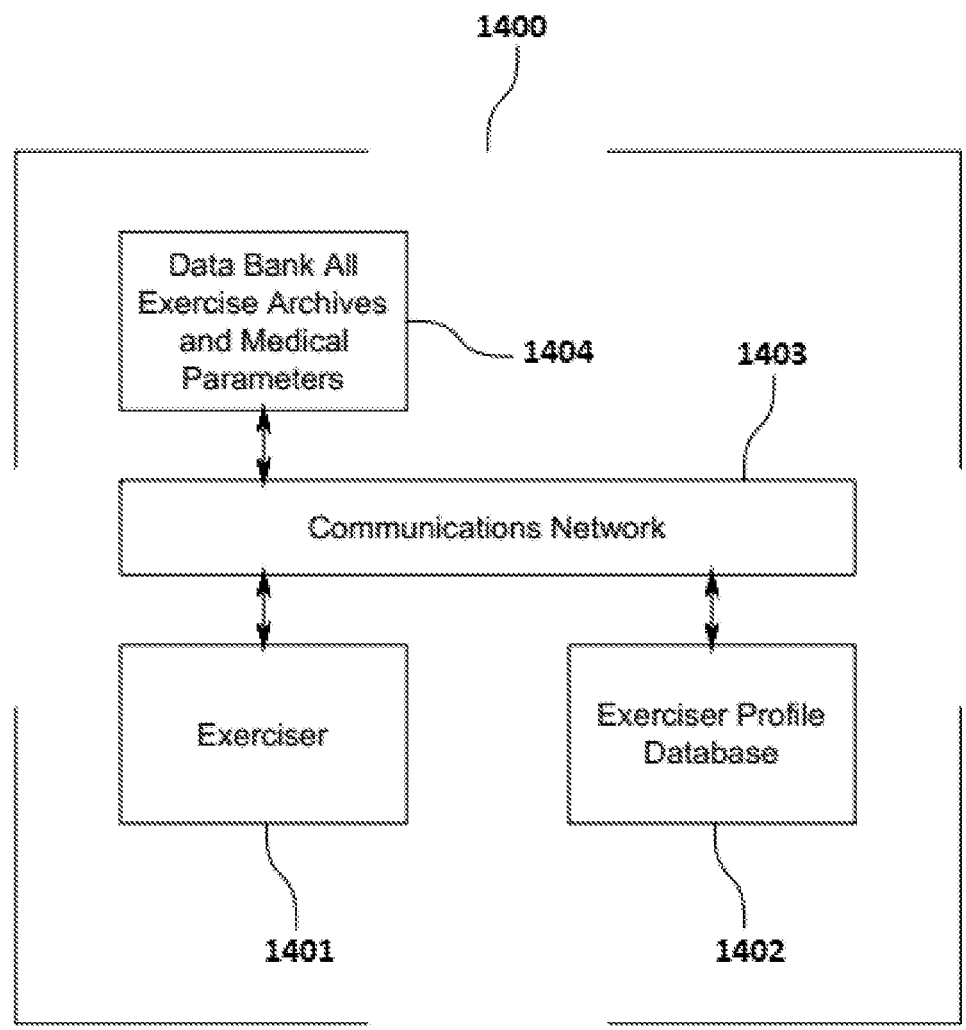
FIG. 14 illustrates a schematic diagram of an exemplary system environment, according to an embodiment of an invention.

Referring to FIG. 14 now, which illustrates schematic diagram of an exemplary system environment 1400 of present invention. The system environment 1400, where the user or exerciser 1401 is capable to access his past and present real time monitored data over his/her network enabled user device 600 using communication network 1403 of a system. The system environment 1400, wherein the communication network 1403 is communicatively coupled to Exerciser profile data 1402 and with Data bank of all exercise archive and medical parameters 1404, and allows user/exerciser 1401 to access that data by coupling user device 600 to the communication network 1403 of the system environment 1400.

Figure 15:
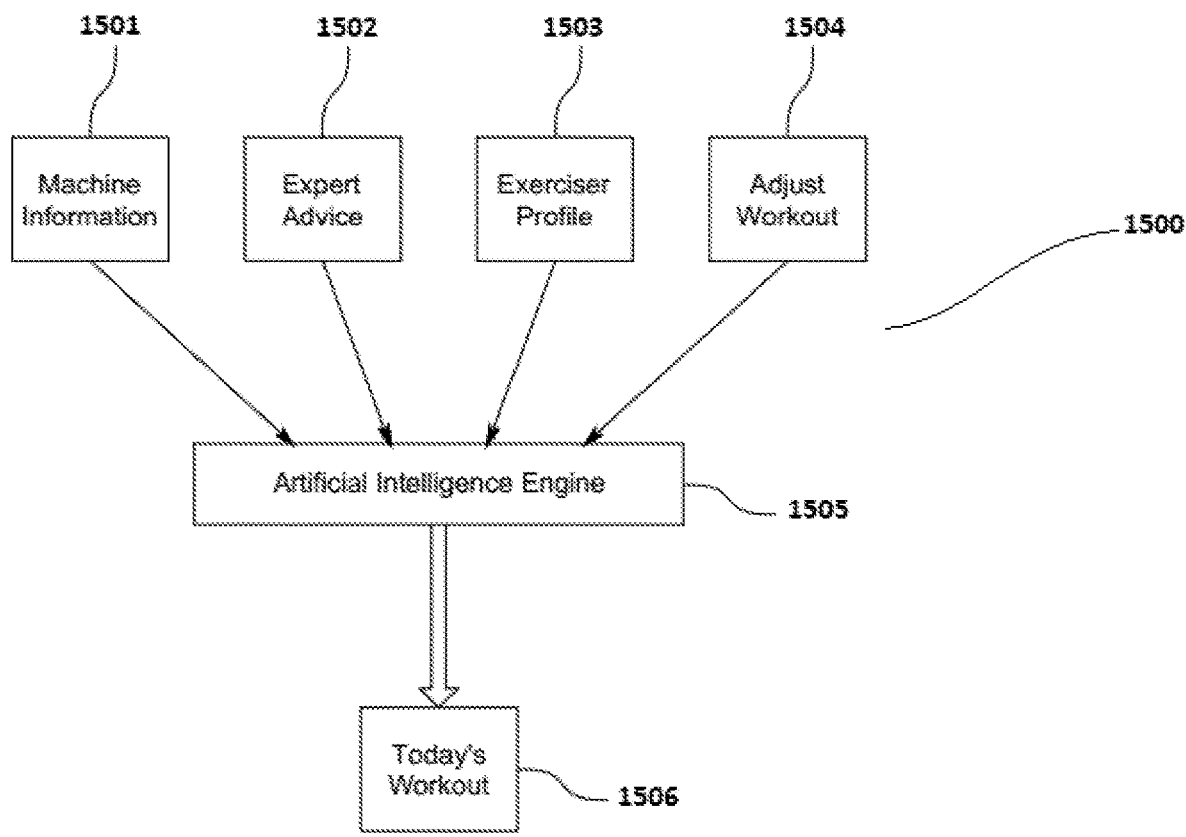
FIG. 15 illustrates a schematic diagram of an overview of an aspect of the invention for providing daily workout suggestion, according to an embodiment of present invention.

FIG. 15 illustrates a schematic diagram of an overview of an aspect 1500 of the invention for providing daily workout suggestion, according to an embodiment of present invention. The present aspect of evaluation of suggestion of present day's work out 150 using an Artificial Intelligence Engine 1505, where the Artificial Intelligence engine 1505 of a system 1500 collects information of the exercisers, machines and equipment from different units and modules of a system 1500, such information includes present and past data of machines 1501 within the facility related to the exerciser; considers expert's advice 1502 for the same exerciser; Evaluates and considers profile of an exerciser 1503; adjusts past workout schedules and strategies of exerciser 1504 and based on all of this data, the artificial intelligence engine 1505 of a system 1500 evaluates, prepares and suggests the present day workout 1506 to the exerciser. The artificial intelligence engine is a central processing unit same as computer processor and computer configured at remote place that receives, monitors and interprets real time data of plurality of exercisers from plurality of advance exercise facilities communicatively coupled to the central processing unit via exercise facility networks. The central processing unit/artificial intelligence engine 1505 also stores received data, and based on this data and real time data, prepares and suggests strategy of workout to the registered exerciser within various exercise facilities of system.

Figure 16:
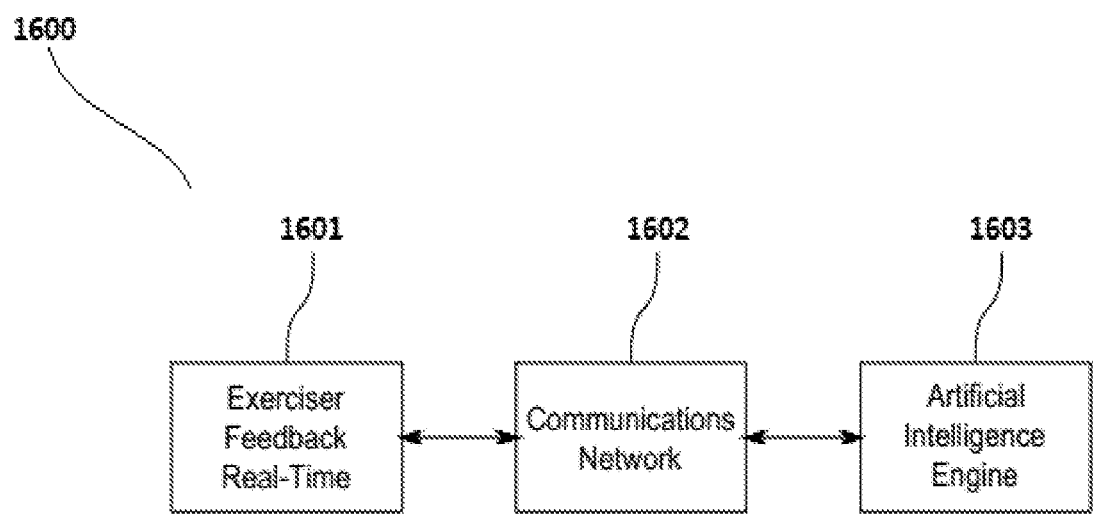
FIG. 16 illustrates a schematic diagram of an exemplary interaction of user with the artificial intelligence engine, according to an embodiment of present invention.

Now, FIG. 16 illustrates a schematic diagram of provision 1600 of interaction of user with the artificial intelligence engine 1603, according to an embodiment of present invention. The user or an exerciser 1601 are capable of giving feedback in real time 1601 using a communication network 1602 to the artificial intelligence unit 1603 of a provision 1600 that evaluates the feedback and accordingly modifies of changes the present or future workout suggestions.

Figure 17:
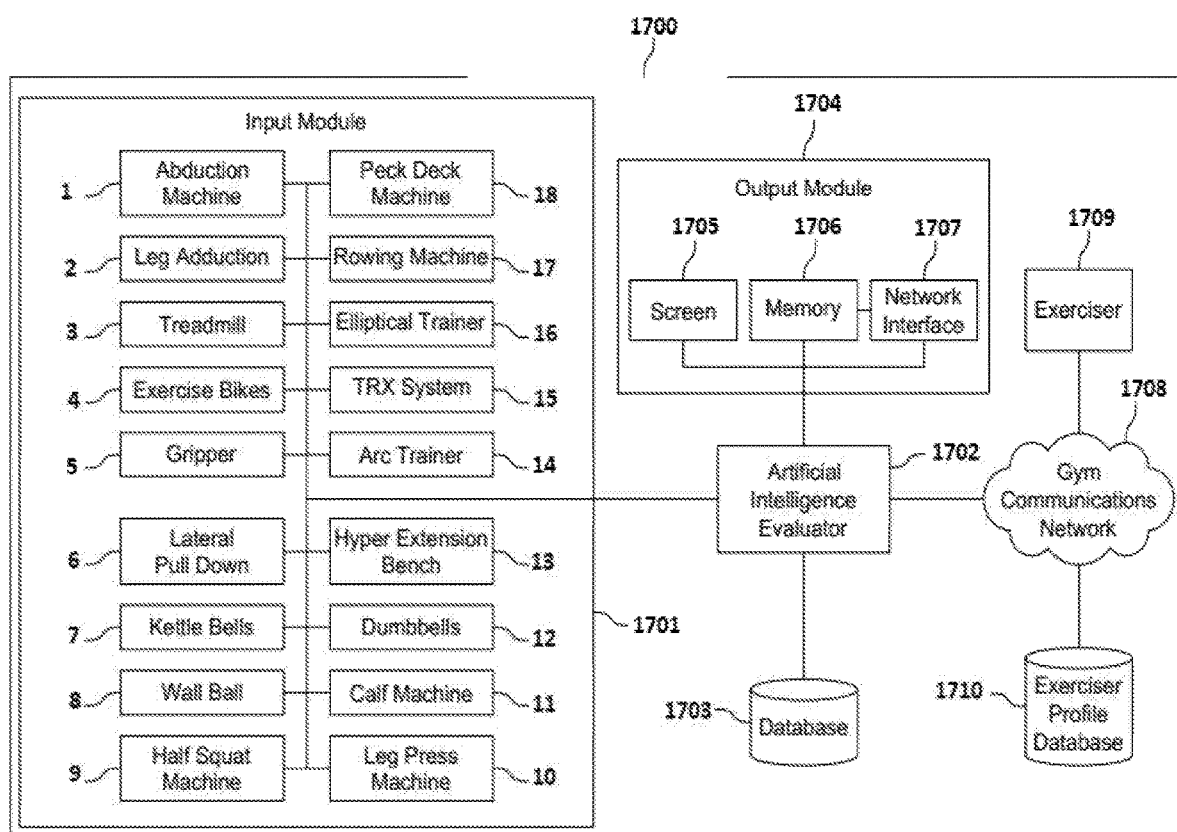
FIG. 17 illustrates complete schematic diagram of artificial intelligence powered advance exercise facility/gym, according to an embodiment of present invention.

Now, referring to FIG. 17 that shows complete schematic diagram 1700 of an artificial intelligence powered advance exercising facility/gym, according to an embodiment of present invention. The system 1700 of present embodiment shows an input module 1701 comprising plurality of or all the machines and equipment of an exercise facility as an input module communicatively coupled to the Artificial Intelligence Evaluator/Engine 1702 to send real time information and data to the AI engine 1702 and receive commands and notifications from the AI engine 1702. The Input Module 1701 of present embodiment comprises smart chip embedded machines and equipment such as, but not limited to, a abduction machine 1, a leg adduction machine 2, a Treadmill 3, an exercise bikes 4, a grippers 5, a lateral pull down machine 6, a kettle bells 7, a wall ball 8, a half squat machine 9, a leg press machine 10, a calf machine 11, a dumbbells 12, a hyper extension bench 13, an arc trainer 14, a TRX system 15, an Elliptical trainer 16, a rowing machine 17 and a peck deck machine 18. All the said and other machines and equipment are embedded with smart chips that monitors and transmits real time data to the AI engine 1702.

The Artificial Intelligence Engine 1702, based on the received data of an exerciser from various machines of input module 1701, prepares a database 1703 to store all the past and real time data of all the registered exercisers 1709. The system 1700 of artificial intelligence powered Advance exercise facilities further includes output module 1704 to display or store data from input modules 1701. The Output module 1704 of present system 1700 includes a screen 1705 to display real time exercise data of exercisers using different machines and equipment of system 1700, a storage or memory unit 1706 to store data externally and a network interface module 1707 to allow various network enabled devices to communicatively coupled with the AI engine 1702 to receive and monitor the data.

The system 1700 allows communicative coupling of all the exercisers 1709 of different exercise facilities of system 1700 with the artificial intelligence engine 1702 using local gym communication networks 1708 of all the exercise facilities. Using respective gym communication network 1708 of exercise facility within which exerciser 1709 is present, the exerciser 1709 sends information to the AI engine 1702 or receives real time guidance of exercise over his/her user devices via gym communication network 1708. The Gym communication network 1708 of the present system 1700 further communicatively couples with the exerciser profile database 1710 that stores all the data of all the exercisers 1709 within respective exerciser facility.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A system of an artificial intelligence (AI) powered advance exercising facilities comprising of:
    an exercising facility having a plurality of smart chips and cameras confined within a plurality of horizontal or vertical mounting members and embedded at different locations within a wall and a ceiling of a perimeter of the exercising facilities to monitor and collect real time data of an exerciser within the exercising facilities; a plurality of smart chips embedded in machines or equipment within the exercising facility;
    a plurality of input units or modules embedded with the plurality of smart chips and configured within the perimeter of the exercising facilities;
    an artificial intelligence engine;
    a storage unit communicatively coupled with the artificial intelligence engine for storing the real time data of the exerciser and preparing an archived database;
    at least one wireless networking device configured within each of the exercising facilities of the system to provide a medium of communication, coupling and data sharing between all the plurality of smart chips embedded machines or equipment, the artificial intelligence engine and the exerciser or other persons of concern;
    a network enabled user device that allows access and monitoring of the system by the exerciser; and
    a plurality of output units or modules to store or display the real time data externally for trainers and physicians;
    wherein the plurality of input units further includes a height adjustable holding platform with a keyboard for the network enabled user device;
    wherein the artificial intelligence engine is a combination of a central processing or control unit and a server configured at any remote location;
    wherein the plurality of output units or modules are any of the external main displays configured within the exercising facilities or any external storage devices or any network interface devices;
    wherein the Artificial Intelligence (AI) engine is configured to evaluate a best workout schedule, to evaluate all machines for a workout and a sequence of machines for a workout, to evaluate a number of repetitions, a speed of repetitions and a dead-weight for a workout on each machine, to evaluate a new workout schedule based on a real time body condition of the exerciser during the workout and to notify the exerciser about a new workout on a contemporaneous basis; and wherein the Artificial Intelligence (AI) engine is further configured to intervene to manipulate the exercise routine of the exerciser and machine operation when it detects weakness or poor form in the exerciser or completely shut down the exercising facility in an emergency situation.

2. The system of an artificial intelligence (AI) powered advance exercising facilities of claim 1, wherein the system includes plurality of exercising facilities at different locations which are coupled with the central artificial intelligence engine of the system using local exercising facility network of the exercising facilities.

3. The system of an artificial intelligence (AI) powered advance exercising facilities of claim 1, wherein each of the plurality of smart chip is a combination of sensors and processors that monitors, records and transmits real time exercise data to the artificial intelligence engine via exercise facility network.

4. The system of an artificial intelligence (AI) powered advance exercising facilities of claim 1, wherein the real time data includes real time activity of the exerciser, exercise regimen, routine of the exerciser, form and posture of the exerciser, number of reps and count of dead weight in each exercise.

5. The system of an artificial intelligence (AI) powered advance exercising facilities of claim 1, wherein the smart chip embedded input unit includes, but not limited to, an abduction machine, a leg adduction machine, a Treadmill, an exercise bike, a plurality of grippers, a lateral pull down machine, a plurality of kettle bells, a wall ball, a half squat machine, a leg press machine, a calf machine, a plurality of dumbbells, a hyper extension bench, an arc trainer, a TRX system, an Elliptical trainer, a rowing machine, a peck deck machine, a multipurpose machine or any other exercising machine and deadweight.

6. The system of an artificial intelligence (AI) powered advance exercising facilities of claim 1, wherein the network enabled user devices allows manipulation of machine operation, monitoring or recording of real time exercise data, displays the exercise data, and archive exercise work out data by connecting to the Artificial Intelligence engine wirelessly.

7. The system of an artificial intelligence (AI) powered advance exercising facilities of claim 1, wherein the network enabled user devices eliminates needs of a conventional permanently fixed monitoring display on the exercising machines of the input unit.

8. The system of an artificial intelligence (AI) powered advance exercising facilities of claim 1, wherein the network enabled user device is any of the Laptop, Tablet, Smartphone, smart-watch or any other smart wearable device.

9. The system of an artificial intelligence (AI) powered advance exercising facilities of claim 1, wherein the Artificial Intelligence (AI) engine is configured to retrieve data and records of medical health of exerciser, regimen of exerciser, past exercise routine and history, identify or evaluate best exercise routine and training advice for the exerciser and to provide the advice to the exerciser over the network enabled user device of an exerciser.

10. The system of an artificial intelligence (AI) powered advance exercising facilities of claim 1, wherein the output units or modules are configured to allow the physicians, experts, trainers or other person of concern to monitor, record and in some cases, intervene to slow down the exercise routine or stop completely in any emergency.

* * * * *